United States Patent
Hosaka

(10) Patent No.: US 12,265,730 B2
(45) Date of Patent: Apr. 1, 2025

(54) MAGNETIC DISK DEVICE AND CACHE CONTROL METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masachika Hosaka, Komae Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/467,140

(22) Filed: Sep. 14, 2023

(65) Prior Publication Data
US 2024/0289049 A1    Aug. 29, 2024

(30) Foreign Application Priority Data
Feb. 24, 2023    (JP) .................. 2023-027344

(51) Int. Cl.
*G06F 3/06*    (2006.01)
*G06F 12/0802*    (2016.01)

(52) U.S. Cl.
CPC .......... *G06F 3/0656* (2013.01); *G06F 3/0604* (2013.01); *G06F 3/0659* (2013.01); *G06F 3/0676* (2013.01); *G06F 12/0802* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 7,437,502 B1 | 10/2008 | Coker | |
| 7,487,290 B2 | 2/2009 | Hiratsuka et al. | |
| 11,194,725 B2 | 12/2021 | Pinho et al. | |
| 2014/0082310 A1* | 3/2014 | Nakajima | G06F 3/061 711/E12.103 |
| 2014/0149706 A1* | 5/2014 | Shim | G06F 13/28 711/165 |

* cited by examiner

*Primary Examiner* — Brian R Peugh
(74) *Attorney, Agent, or Firm* — Knobbe Martens Olson & Bear LLP

(57) ABSTRACT

According to one embodiment, a magnetic disk device comprises a control part configured to execute a cache control based on accompanying information included in a command wherein the command includes a data write command to a disk or a data read command from the disk.

11 Claims, 7 Drawing Sheets

(a)

| No | LBA | Block | Descriptor number | Write/Read |
|---|---|---|---|---|
| 1 | 3000h | 100h | Descriptor 3 | Write |
| 2 | 2300h | 8h | Descriptor 1 | Read |
| 3 | 3000h | 100h | Descriptor 2 | Read |
| 4 | 7500h | 200h | Descriptor 1 | Read |
| 5 | 7700h | 200h | Descriptor 1 | Read |
| 6 | 5000h | 64h | Descriptor 2 | Write |
| 7 | 8A00h | 100h | Descriptor 3 | Read |
| 8 | 6000h | 10h | Descriptor 1 | Write |
| ⋮ | ⋮ | ⋮ | ⋮ | ⋮ |

(b)

| Descriptor | Limit Time(Write) | Limit Time(Read) |
|---|---|---|
| 1 | 100ms | 100ms |
| 2 | 300ms | 300ms |
| 3 | 2000ms | 2000ms |

F I G. 4

| Descriptor number | Sequential ratio condition | Cache control |
|---|---|---|
| I | X% or more | Perform read-ahead process |
| J | Y% or less | Not perform read-ahead process |

(a)

| Descriptor number | Sequential ratio | Limit Time | Cache control | |
|---|---|---|---|---|
| 1 | X% or more | N[ms] or less | Perform read-ahead T1[ms] | CD11 |
|   |              | Above N[ms]   | Not perform read-ahead | CD12 |
|   | From Y% to X% | N[ms] or less | Perform read-ahead T2[ms] | |
|   |               | Above N[ms]   | Not perform read-ahead | |
|   | Y% or less   | N[ms] or less | Not perform read-ahead | |
|   |              | Above N[ms]   | Not perform read-ahead | |

(b)

| Descriptor number | Sequential ratio | Limit Time | Cache control | |
|---|---|---|---|---|
| 2 | 70% or more   | 100ms or less | Perform read-ahead 8.3ms | |
|   |               | Above 100ms   | Not perform read-ahead | |
|   | From 10 to 70% | 100ms or less | Perform read-ahead 4ms | CD23 |
|   |                | Above 100ms   | Not perform read-ahead | |
|   | 10% or less   | 100ms or less | Not perform read-ahead | |
|   |               | Above 100ms   | Not perform read-ahead | |

(c)

| Descriptor number | Command estimation | Contents data estimation | Cache control | |
|---|---|---|---|---|
| 1 | Write request of sequential LBA | Recording data | Perform read-ahead process | CD31 |
| 2 | Read request of sequential LBA | Video playback data | Not perform read-ahead process | CD32 |
| 3 | Random LBA | Non-video data | Not perform read-ahead process | CD33 |

F I G. 8

MAGNETIC DISK DEVICE AND CACHE CONTROL METHOD

CROSS-REFERENCE TO RELATED APPLICATIONS

This application is based upon and claims the benefit of priority from Japanese Patent Application No. 2023-027344, filed Feb. 24, 2023, the entire contents of which are incorporated herein by reference.

FIELD

Embodiments described herein relate generally to a magnetic disk device which caches data, and a cache control method.

BACKGROUND

In order to improve the performance of a hard disk, cache control techniques such as a read-ahead technique are used widely, wherein logical block addresses (LBAs) subsequent to a LBA designated by a read command are sequentially read. The read-ahead technique focuses on the continuity of accesses to the LBAs by a read command, and subsequent LBAs are stored in the cache to improve a response performance.

However, even when the read-ahead is performed, without a read command with respect to cached subsequent LBAs, a time used for read-ahead, and power used therein may possibly be wasted.

The present application presents a magnetic disk device and a cache control method which are prepared in consideration with characteristics of command.

BRIEF DESCRIPTION OF THE DRAWINGS

FIG. 4 illustrates an example of issue command data stored in the magnetic disk device of the embodiment.

FIG. 8 illustrates an example of cache control designated with respect to accompanying information stored in a magnetic disk device of a variation.

DETAILED DESCRIPTION

Hereinafter, embodiments of the present application will be explained with reference to the accompanying drawings.

In general, according to one embodiment, a magnetic disk device comprises a control part configured to execute a cache control based on accompanying information included in a command wherein the command includes a data write command to a disk or a data read command from the disk.

Embodiment

A magnetic disk device of the present embodiment analyzes per accompanying information of commands transmitted by a host. Descriptor is used for the accompanying information. Characteristics of the commands indicate, for example, if commands sequentially arriving are to designate sequential LBAs in the disk, and if they are to designate LBAs which are not sequential in the disk, and especially in this example, the former characteristic of the commands will be referred to as sequential access, and the latter characteristic will be referred to as random access. The magnetic disk device estimates the characteristics of the command to be received next by analyzing the accompanying information and controls a read-ahead process.

Figure 1:
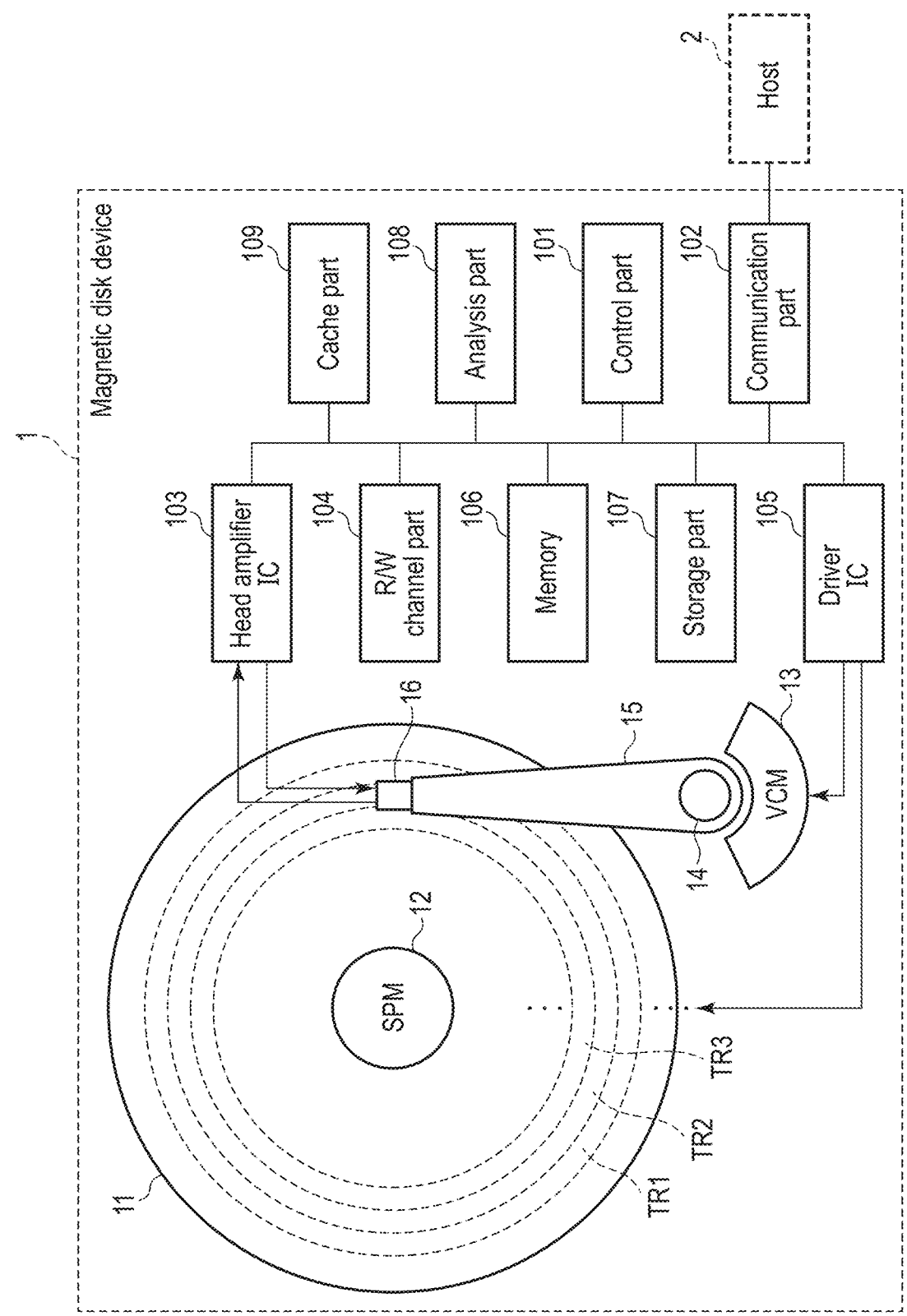
FIG. 1 is a functional block diagram of a magnetic disk device of an embodiment.

FIG. 1 is a functional block diagram of a magnetic disk device of the embodiment.

A magnetic disk device 1 is a storage device with a magnetic disk from/in which data are read/written (hereinafter, may be referred to as disk), and includes a computer function such as a microprocessor. The magnetic disk device 1 outputs data to a host 2, and writes data from the host 2 to the magnetic disk based on commands received from the host 2, for example.

A disk 11 is a disk-shaped magnetic rotational disk storage medium including a data writable (may be referred to data write) area in which a user data area which can be used by a user and a system area in which information required for the system management are assigned. Hereinafter, a direction orthogonal to a radial direction of the disk 11 will be referred to as circumferential direction. The disk 11 is attached to a spindle 12 and is rotated by the drive of the spindle 12.

A plurality of tracks are set in the disk 11. In the figure, three tracks TR1, TR2, and TR3 (or may be referred to as track TR if specific distinction is unnecessary) are shown for example, while a plurality of tracks are set in a concentric manner about the spindle 12 in the data area. When executing read/write of data from/to the disk 11, a head 16 is moved to a track TR to be subjected to write/read target data through a seek control, tracking control, and the like, and the head 16 performs the read/write. Specifically, data on the disk 11 will be referred to as disk data, data on the disk 11 commanded to be read will be referred to as read data, and data to be written to the disk 11 will be referred to as write data.

The spindle 12 is a pillar of the disk 11, and is provided with, for example, the body of the magnetic disk device 1. When the spindle 12 rotates, the disk 11 rotates accordingly.

A VCM 13 is a voice coil motor type actuator, and is used to move an arm 15, or the like. The VCM 13 controls an operation of the arm 15 based on current input thereto. Note that, in the present embodiment, the VCM 13 is used as an example, however, it is not limited to a voice coil motor type actuator.

A pivot 14 supports the arm 15, and the like, and is a bearing for rotation motion, for example.

The arm 15 is an arm supporting a head 16, transfers motion from the VCM 13 to the head 16, and moves the head 16 to a target track TR.

The head 16 is a portion to write data to the disk 11 and to read data recorded in the data tracks of the disk 11. Specifically, the head to write data to the disk 11 will be referred to as write head 16W and the head to read data recorded in the data tracks of the disk 11 will be referred to as read head 16R.

A control part 101 is a hard disk controller which receives a command from the host 2 and controls each component of the magnetic disk device 1 based on the received command. The control part 101 may contain a computer function such as CPU or microprocessor, a hardware such as IC chip and the like with a computer, or a software. The control part 101 receives, from the host 2, for example, a data write command to the disk 11 and a data read command to the disk 11 and the like.

Upon receipt of the command from the host 2, the control part 101 of the present embodiment extracts accompanying information added to the command, and determines an operation of cache control base on accompanying information. For example, upon receipt of a read command, the control part 101 extracts accompanying information described in the read command, and determines whether or not read-ahead of the disk data is performed based on the extracted accompanying information and a predetermined condition.

The accompanying information is, for example, information of command active time, and command priority and the like. For example, when the host 2 transmits a command including the accompanying information of command active time, a condition of a preferred time used for processing per command can be requested for HDD 1. Furthermore, the priority can be used as determination information to determine a command to be executed when multiple commands are received by the HDD 1.

In the present embodiment, as accompanying information, a case where Descriptor of command duration limits (CDL) feature set of an ATA Command Set-5 is used, which is a standard applied to data communication between the magnetic disk device 1 and the host 2, will be explained. In the present standard, value specifying Descriptors of seven patterns at the maximum can be set in the commands.

Various processings of the control part 101 may be executed by a software (including firmware, and the like) program, or may be executed by a hardware, or a combination of software and hardware.

A communication part 102 is connected to a cable, and exchanges data with the host 2.

The head amplifier IC 103 includes, for example, a read amplifier and a write driver. The read amplifier amplifies a read signal read from the disk 11 to be output to an R/W channel 104. The write driver outputs write current corresponding to a signal output from the R/W channel 104 to the head 16.

The R/W channel 104 controls, in response to an instruction from the control part 101 and the like, the head amplifier IC 103 to perform data read from the disk 11 and data write to the disk 11. The R/W channel 104 receives a read data signal from the head amplifier IC 103 to extract data of the disk 11 (read data), and generates write data signal based on data commanded to be written (write data) to be output to the head amplifier IC 103. Furthermore, the R/W channel 104 extracts servo information from the read data signal received from the head amplifier IC 103.

The driver IC 105 outputs current or a voltage to drive and/or control the SPM 12 and the VCM 13 according to the control from the control part 101 and the like.

A memory 106 is a semiconductor memory which loses data stored therein if power supply thereto is cut, and may be used as a working memory of the control part 101, for example. The memory 106 is, for example, Dynamic Random Access Memory (DRAM) or Synchronous Dynamic Radom Access Memory (SDRAM).

A storage part 107 is a semiconductor memory to maintain data stored therein even if power supply thereto is cut. The storage part 107 stores, for example, data and programs required for the processings in the magnetic disk device 1 such as issue command data, and condition table. The storage part 107 is, for example, NOR or NAND flash ROM (Flash Read Only Memory: FROM).

An analysis part 108 analyzes issue command data of the storage part 107. Details will be explained later.

A cache part 109 is a semiconductor memory to temporarily store data and the like in a cache. For example, the cache part 109 is a buffer to temporarily store commands received by the magnetic disk device from the host system 2. The cache part 109 is, for example, DRAM, Static Random Access Memory (SRAM), SDRAM, Ferroelectric Radom Access Memory (FeRAM), or Magnetoresistive Random Access Memory (MRAM). Note that, the cache part 109 and the memory 106 may be physically integrated.

The host 2 is, for example, a personal computer main body, and outputs read/write commands of data with respect to the magnetic disk device 1.

Figure 2:
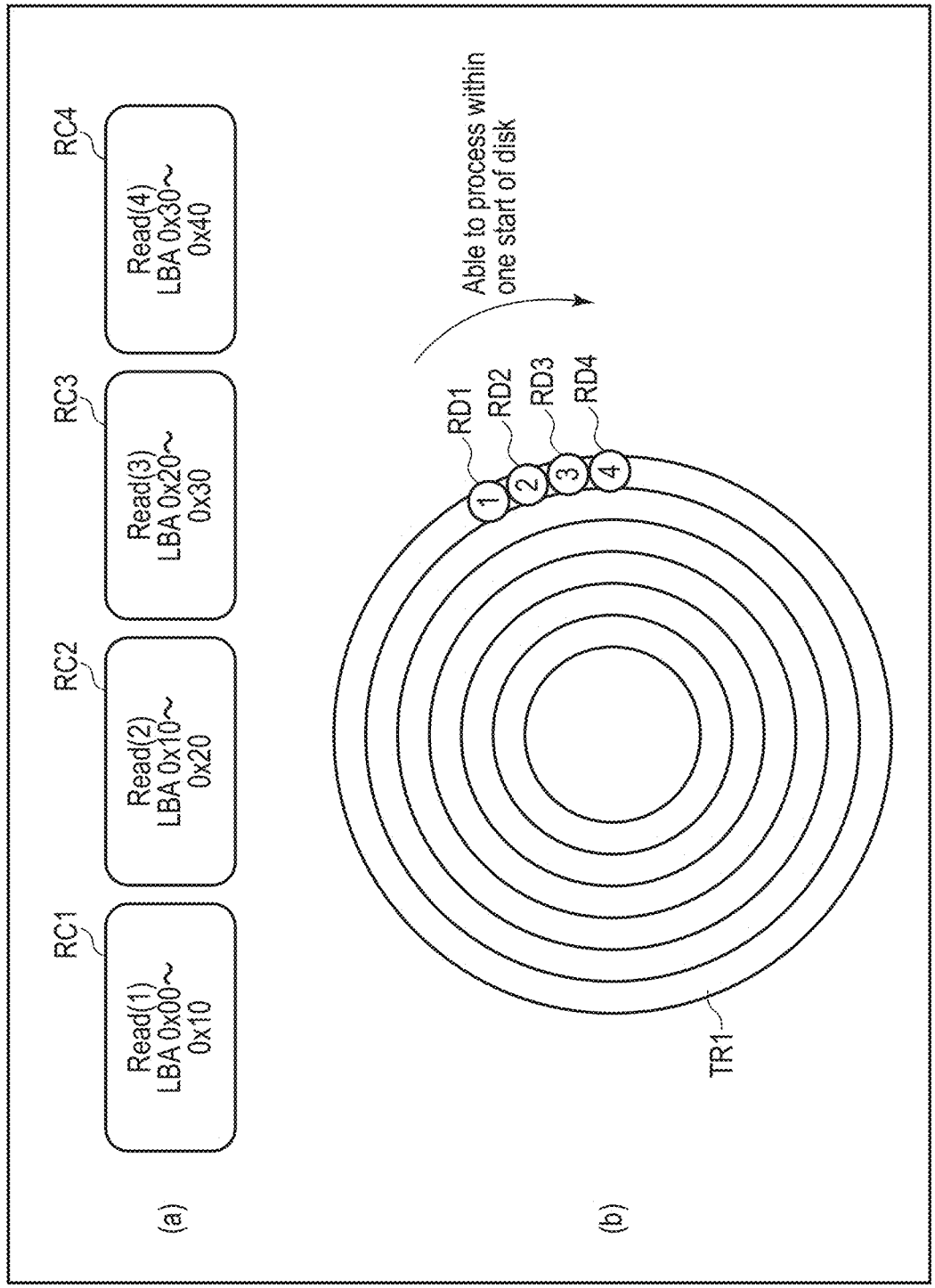
FIG. 2 is a schematic diagram illustrating a concept of sequential read of the magnetic disk device of the embodiment.

FIG. 2 is a schematic view illustrating sequential read of the magnetic disk device of the embodiment.

LBA is a method of accessing to disk data on the disk 11, in which an address assigned to an access unit (for example, sector) of the disk 11 is designated to access data. The host 2 outputs a command including the address to the magnetic disk device 1 to access to desired disk data.

FIG. 2(*a*) is an example of read command to be output by the host 2 to access the disk data, and a data address (LBA) is included in each of read commands RC1 to RC4 (if specific distinction is unnecessary, referred to as RC).

FIG. 2(*b*) indicates an example of a position of disk data on the disk 11 designated by the read command RC, in which four designated read data RD1 to RD4 (if specific distinction is unnecessary, referred to as RD) are positioned sequentially on the disk 11.

Generally, if LBAs of multiple read data RD are not sequential as in FIG. 2(*b*), in a process of each read command of the control part 101, there occurs a rotation wait per read command for overhead of a firmware (FW) process. In order to decrease the overhead of the process, there may be a case where a processing method of sequential read is applied.

A method for the sequential read is to read disk data (for example, RD1 to RD4) of multiple read commands (for example, RC1 to RC4) in one read process start by one read command (for example, RC1) and store the disk data in the cache part 109, and if RC2 to RC4 commands are received, to perform the sequential processing using the data stored in the cache part 109.

If LBAs are sequential as in FIG. 2(*b*), the sequential read can be applied. For example, the control part 101 performs the sequential read to preliminarily set a range of access to the disk 11 to be wider than a range designated by the command, stores the read disk data in the cache part 109, and transfers the stored data in order to avoid unnecessary rotation wait for the disk 11 and the overhead of FW, resulting improved performance of the magnetic disk device 1. Note that, the processing method of sequential read or the like can be applied to a case where data is written to the disk 11.

Figure 3:
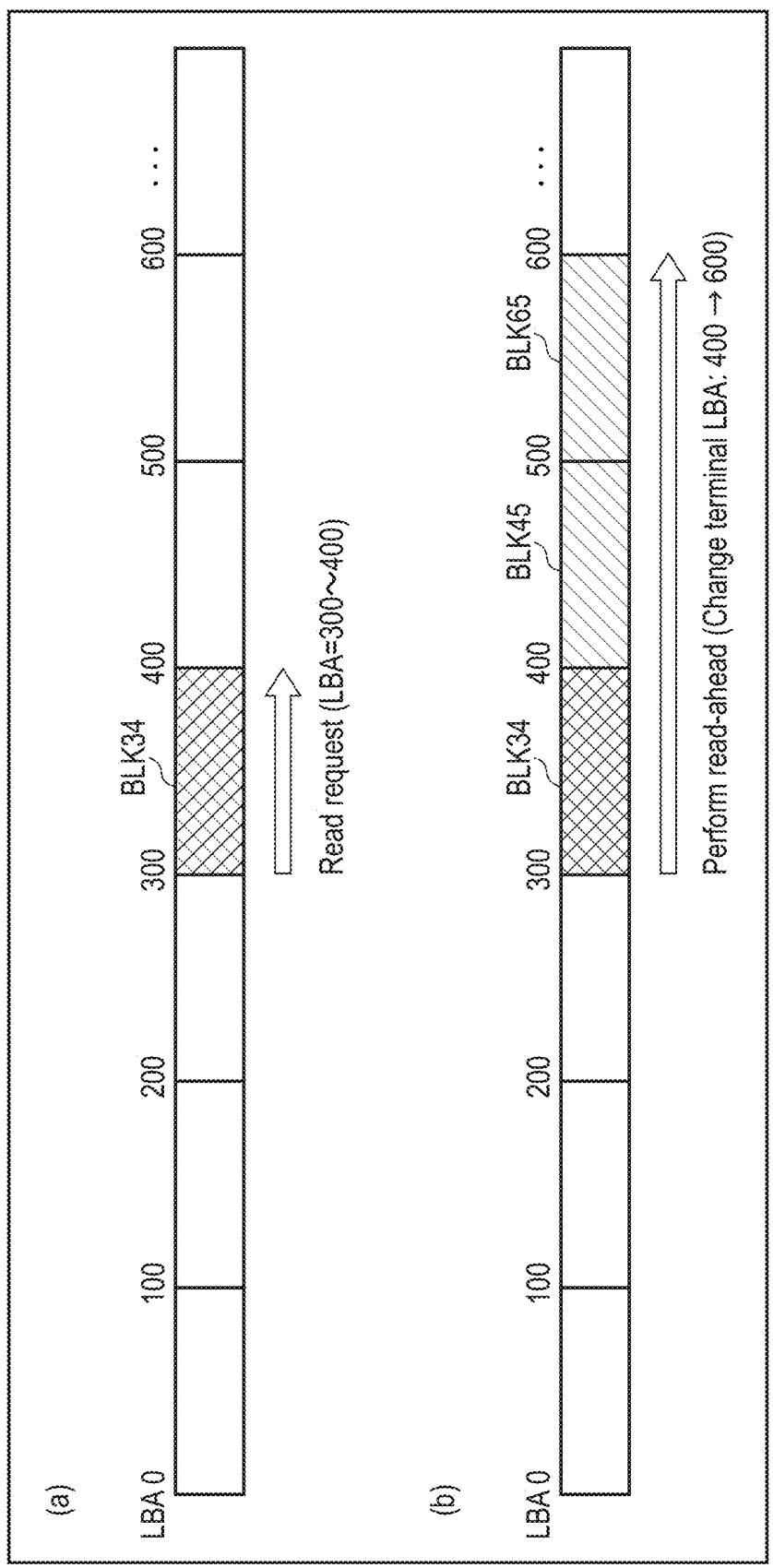
FIG. 3 is a schematic diagram illustrating a read-ahead technique of disk data of the magnetic disk device of the embodiment.

FIG. 3 is a schematic diagram illustrating the concept of a read-ahead technique of the disk data of the magnetic disk device of the embodiment.

In the read-ahead technique, when a read command is received, a certain block number is added to a terminal LBA of the requested read command, and disk data is read-ahead for a wider range.

FIG. 3(a) is a schematic diagram illustrating sequential blocks (for example, sector) on the disk 11 in a linear fashion. BLK 34 indicates data on the disk 11 from LBA 300 to LBA 400. The control part 101 receives a read command requesting read of BLK 34, and if it is determined that read-ahead is performed with respect to the command, data ahead BLK 34 is read from the disk 11. Specifically, the control part 101 changes the terminal LBA from 400 to 600 as in FIG. 3(b), and reads a range between 300 and 600 (BLK 34, BLK 45, and BLK 65) at once from the disk 11. Furthermore, apart from the read-ahead technique, there is a lookahead technique in which a certain block number is subtracted from the terminal LBA of a requested read command and read is performed beforehand in a wider range; however, since it is a well-known technique, the detailed description thereof will be omitted here.

The magnetic disk device of the present embodiment stores the issue command received from the host 2 in the storage part 107 as a database.

FIG. 4 illustrates an example of issue command data stored in the magnetic disk device of the embodiment.

FIG. 4(a) illustrates an example of the data base of issue command received by the magnetic disk device 1 from the host 2, and information data such as LBA, Block, Descriptor number, Write/Read included in the command per row. LBA indicates start address of data block targeted by the command (hexadecimal number), and Block indicates a data block number targeted by the command (hexadecimal number). Descriptor number indicates a pattern identification number of Descriptor, and for example, in definition of ATA Command Set-5, seven pattern Descriptors can be defined at the maximum, and thus, one to seven Descriptor numbers may be assigned to the patterns. Write/Read indicates whether the received issue command is a write command (Write) or a read command (Read).

FIG. 4(b) illustrates an example of a condition designated for Descriptor which is accompanying information of the command, in which a command limit time (Limit Time) with respect to the write command (Write) and the read command (Read) is set in each Descriptor.

For example, Descriptor of Descriptor number 1 is an example in which a condition is set to the accompanying command such that a limit time between receipt of the write command and data write to the disk by the magnetic disk device 1 is 100 ms, and a limit time between receipt of the read command and read of disk data is 100 ms.

For example, No. 1 command of FIG. 4(a) is a write command to 100h sequential Blocks starting from LBA of 3000h, and accompanying information of Descriptor number 3 is included. As in FIG. 4(b), Descriptor number 3 is a condition where a limit time of write time is 2000 ms, and a limit time of read time is 2000 ms. That is, the command of No. 1 is conditioned such that data is written to a designated block in a limit time of 2000 ms, and the command is completed in a limit time 2000 ms.

Furthermore, for example, No. 4 command of FIG. 4(a) is a write command to 200h sequential Blocks starting from LBA of 7500h, and accompanying information of Descriptor number 1 is included. As in FIG. 4(b), Descriptor number 1 is a condition where a limit time of write time is 100 ms, and a limit time of read time is 100 ms. That is, the command of No. 4 is conditioned such that data is read from a designated block in a limit time 100 ms, and the command is completed in a limit time 100 ms.

Hereinafter, an example of an operation of an analysis process of the received issue command by the magnetic disk device will be explained.

Figure 5:
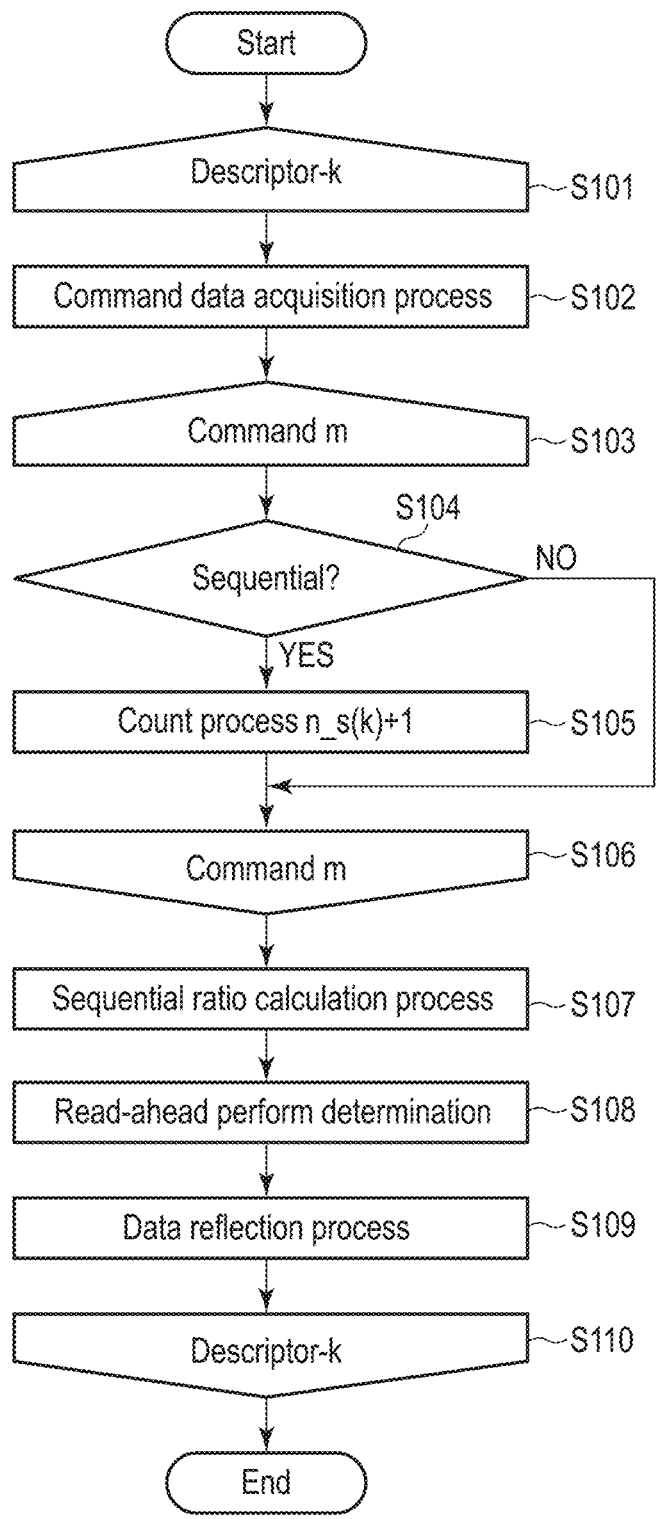
FIG. 5 is a flowchart of an analysis process of the issue command data by the magnetic disk device of the embodiment.

FIG. 5 is a flowchart of the analysis process of the issue command data by the magnetic disk device of the embodiment.

Using a data analysis command received from the control part 101 as a trigger, the analysis part 108 performs a statics analysis of data per Descriptor number (steps S101 to S110). Hereinafter, Descriptor with a Descriptor number k will be referred to as Descriptor-k and the like. In this example, the analysis with respect to read command data will be considered, and analysis with respect to write command data can be performed similarly by replacing the read command with a write command.

The analysis part 108 acquires n issue commands including Descriptor-k from the database of the storage part 107 (step S102). For example, n issue commands including the read command of Descriptor-1 (corresponding to No. 2, 4, and 5 in the database of FIG. 4(a)).

The analysis part 108 analyzes the acquired n command data (steps S103 to S106). The analysis part 108 determines, for example, whether or not LBA designated by the analysis target command data m is sequential to LBA designated by one-previous received command data m−1 (step S104). Here, m is an identification number indicative of a reception order of the analysis target command data acquired in step S102, which may be an integer or a natural number. If the analysis target command m is determined to be sequential, the analysis part 108 counts by adding one to a count value n_s(k) per Descriptor-k (Yes in step S104, S105). On the other hand, if it is determined to be not sequential, the analysis part 108 does not count a count value n_s(k) (No in step S104).

Note that, for example, as in the example of No. 2 to No. 4 of FIG. 4(a), in the database of the storage part 107, a command including another Descriptor or a command with different Write/Read may be included between command data i and command data i−1 with the same Descriptor. In consideration of such a case, in step S104, the analysis part 108 may be externally set to determine whether No. 2 and No. 4 are sequential or not sequential.

When steps S104 and S105 are performed with respect to all of n commands acquired in step S102 (steps S103 to S106), a sequential ratio is acquired as the following formula as a ratio of sequential commands to n commands (step S107).

Sequential ratio=$n\_s(k)/n$

Based on the sequential ratio, whether or not a read-ahead process is performed with respect to the read command including the analysis target Descriptor-k is determined (step S108). The determined contents will be stored in, for example, the storage part 107 or data-updated (step S109).

Note that, the data analysis of the aforementioned analysis part 108 may be performed to a specific Descriptor alone, for example. Furthermore, a start trigger of the data analysis by the analysis part 108 (step S101) may be issued at a time when nth command data is counted while counting issue command data stored in the storage part 107 per Descriptor-k, or may be issued at a time when the control part 101 receives issue command with Descriptor-k. For example, when the number of issue command data including Descriptor-k newly received by the control part 101 becomes n, the data analysis with respect to Descriptor-k may be executed. Furthermore, at each time when one issue command data is received, the data analysis with respect to Descriptor-k included therein may be executed.

Furthermore, there may be a case where multiple sequential read command groups may be transmitted from a host. Hereinafter, for example, a case where two sequential read command groups (sequential A and sequential B) are transmitted from a host at the same time will be described.

The host 2 transmits a read command group designating sequential LBAs on TR1 of FIG. 1 (sequential A), and a read command group designating sequential LBAs on TR3 (sequential B). In that case, for example, the magnetic disk device 1 receives read commands in an order of read command 1 of sequential A, read command 1 of sequential B, and read command 2 of sequential A, and stores the received read commands in the database. With respect to such data, the analysis part 108 should analyze per read command group of sequential A and sequential B. Thus, the analysis part 108 may determine, in the aforementioned step S104, that command m is sequential if N_c command data received before the analysis target command m include a read command designating LBA sequential to the LBA designated by the command m. Thereby, the analysis part 108 can perform sequential determination distinguishing the read command groups of sequential A and sequential B.

Further, issue command data may be stored in the storage part 107 during an inspection time of the magnetic disk 11, and data analysis may be executed using the issue command data. Furthermore, a condition table (corresponding to FIG. 6) may be prepared and stored in the storage part 107. In that case, the analysis part 108 may execute the data analysis to prepare the condition table and store in the storage part 107. Or a condition table may be prepared through data analysis performed by a different personal computer and stored in the storage part 107.

Figures 6, 7:
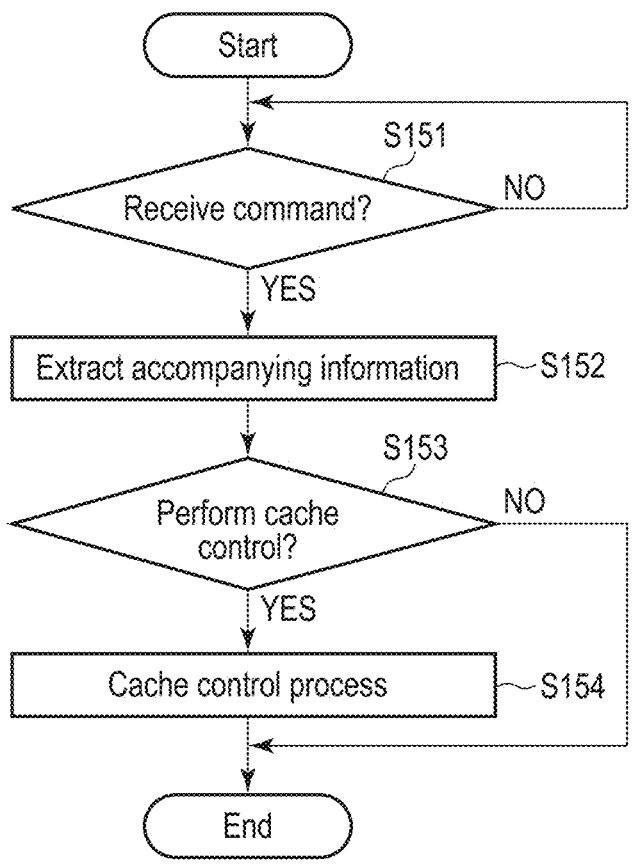
FIG. 6 illustrates an example of a condition table indicative of whether or not cache control is required, which is designated by each accompanying information stored in the magnetic disk device of the embodiment.
FIG. 7 is a flowchart of a read-ahead process of disk data by the magnetic disk device of the embodiment.

FIG. 6 illustrates an example of a condition table indicative of presence/non-presence of cache control designated per accompanying information stored in the magnetic disk device of the embodiment. The cache control includes a read-ahead process with respect to read command, lookahead process, and data cache operation during the processing of a write command.

FIG. 6 is an example of database of the condition table indicative of sequential ratio condition with respect to Descriptor, and indicative of whether or not the cache control is executed, per row. For example, with respect to the read command including Descriptor-I (for example, I is an integer from one to seven) as accompanying information, if the analysis result of the sequential ratio with respect to Descriptor-I acquired in steps S103 to S106 of FIG. 5 satisfies a sequential ratio condition (X % or more), the control part 101 performs the read-ahead process when the read command is received. Similarly, with respect to the read command including Descriptor-J as accompanying information, if the analysis result of the sequential ratio with respect to Descriptor-J acquired in steps S103 to S106 of FIG. 5 satisfies a sequential ratio condition (Y % or less), the control part 101 does not perform the read-ahead process when the read command is received.

The condition table of FIG. 6 may be stored in the storage part 107 or the like, and the sequential ratio condition may be editable. For example, X and Y can be set to optional values. Furthermore, the method of cache control may be a lookahead process instead of read-ahead process, or the process contents may be changed between the read command and the write command.

In step S108 of FIG. 5, the control part 101 may refer to the condition table of FIG. 6, and may determine whether or not the read-ahead process is performed with respect to the command including an analysis target Descriptor based on the sequential ratio acquired by step S107, for example. Furthermore, in step S109, the control part 101 may reflect a result of determination of step S108 onto an item of the read-ahead process of the condition table of FIG. 6.

Hereinafter, an operation to determine whether or not the cache control is executed when the magnetic disk device 1 receives a read command from the host 2 will be described.

FIG. 7 is a flowchart indicative of the read-ahead process of the disk data by the magnetic disk device of the embodiment.

Upon receipt of a read command from the host 2 (Yes in step S151), the control part 101 of the magnetic disk device 1 extracts accompanying information included in the received read command (step S152). The control part 101 refers the condition table (for example, FIG. 6), and determines whether or not the cache control is performed based on the extracted accompanying information (step S153). For example, if FIG. 6 is referred to, and Descriptor number of Descriptor which is accompanying information included in the received read command is I, the control part 101 determines to perform read-ahead of disk data of the block sequential to the block designated as the received read command. If the cache control is performed with respect to the received read command, the control part 101 performs a cache control process (step S154).

In the present embodiment, a read command is used as an example, and through a similar process, a lookahead process and a cache control with respect to a write command can be performed.

Variation

Another example with respect to the condition table used for determination as to whether or not the cache control is performed by the control part 101, which is apart from the example of FIG. 6 will be described.

FIG. 8 illustrates an example of a condition table of a cache control designated with respect to accompanying information stored in a magnetic disk device of the variation.

FIG. 8(*a*) illustrates an example where the operation of cache control is designated with respect to a command including Descriptor-i using a sequential ratio and Limit Time as conditions. X, Y, N, T1, and T2 are parameters which can be set externally of the magnetic disk device 1. In the flowchart of FIG. 5 of the embodiment, the control part 101 designates the operation of cache control analyzing n issue command data per Descriptor-i. In this variation, sequential ratio is acquired by analyzing n issue command data per Descriptor-i, and the operation of cache control is designated by information based on both of the acquired sequential ratio and Limit Time included in Descriptor-i.

For example, as a result of the statistics analysis of data by the analysis part 108, if the sequential ratio of Descriptor-i is X % or more, condition data CD11 of FIG. 8(*a*) determines that it is highly possible that the received command is sequential when Limit Time indicated by Descriptor-i of the received read command is N [ms] or less, in which the operation of cache control with respect to the received command is determined to read-ahead by T1 [ms]. Furthermore, the operation of cache control of FIG. 8(*a*) may be associated with Descriptor number and Limit Time by a program, for example. Note that, the operation of the cache control as in the present variation may include an optional process of increasing an amount of data for read-ahead in addition to performing the read-ahead process.

In the operational phase, upon receipt of the read command from the host 2, the control part 101 acknowledges accompanying information of the read command, and if Descriptor-i is included therein and Limit Time is N [ms] or less, applies the condition data CD11 of FIG. 8(*a*), and executes read-ahead by T1 [ms] from LBA designated by the received read command. Furthermore, if acknowledging that Descriptor-i is included in the received read command and Limit Time is greater than N [ms], condition data CD12 of FIG. 8(*a*) is applied, and the control part 101 does not execute read-ahead.

Furthermore, as in each row of FIG. 8(*a*), through a similar analysis, the analysis part 108 associates the conditions (sequential ratio and Limit Time) per Descriptor-i with the contents of cache control in order to prepare database of the condition table, and the control part 101 determines the cache control with respect to the received command based on the condition table in the operation phase.

Note that, in the example of FIG. 8(*a*), the operation of the cache control is determined using the sequential ratio and Limit Time as conditions, and only sequential ratio or Limit Time may be used as a condition. In the example of FIG. 6, the operation of the cache control of the read command is determined using the sequential ratio as a condition, and for example, the operation of cache control with respect to the read command may be determined using a sequential ratio as condition, based on a read-ahead time in the read-ahead of the read command, and read-ahead data amount. The operation of cache control may be determined by a user, and may be written to the condition table of the storage part 107, or may be programmed such that the operation of cache control may be selected. Furthermore, parameters such as X, Y, N, T1, and T2 may be set by a user, or may be derived by the analysis part 108 through the statistics analysis.

FIG. 8(*b*) illustrates an example where Descriptor-2, X=70, Y=10, N=100, T1=8.3, and T2=4.

For example, the condition data CD23 of FIG. 8(*b*) is an example where, as a result of the data analysis by the analysis part 108, if the sequential ratio of Descriptor-i is greater than 10% and below 70%, the operation of cache control when Limit Time indicated by Descriptor-i of the received read command is 100 [ms] or less is determined to read-ahead by 4 [ms].

Furthermore, the condition data CD23 of FIG. 8(*b*) is an example where, as a result of the data analysis by the analysis part 108, if sequential ratio of Descriptor-i is 10% or more and 70% or less, the operation of cache control when Limit Time indicated by Descriptor-i of the received read command is above 100 [ms] is determined not to read-ahead.

FIG. 8(*c*) illustrates an example of a condition table indicative of whether or not a cache control is performed per Descriptor (per row) based on command estimation and contents data estimation obtained by analyzing the issue command data instead of the sequential ratio, and the condition table may be used to determine whether or not a cache control process is performed when the magnetic disk device 1 is used for, for example, a monitoring camera.

Command estimation of condition data CD31 of FIG. 8(*c*) indicates an example acknowledging it is highly possible that write commands which are sequential LBA write commands are sequential as a result of the statics analysis with respect to the issue command data of the write command including Descriptor-1 by the analysis part 108. Similarly, contents estimation of condition data CD31 indicates an example acknowledging it is highly possible that the write command including Descriptor-1 includes write data transmitted from the host 2 is recording data as a result of the analysis by the analysis part 108. Based on acknowledged command estimation and contents data estimation, upon receipt of the write command including Descriptor-1, the cache control is determined to be performed, and writes to the condition table of the storage part 107 and programming are performed.

Furthermore, upon receipt of the write command from the host 2, the control part 101 acknowledges the accompanying information of the write command, and if Descriptor-1 is acknowledged, the condition data CD31 of FIG. 8(*c*) is applied, a collective write process to collectively store predetermined data in the cache part 109. Note that, the cache control in the write command is performed by, for example, storing the write data transmitted from the host 2 in the cache part 109, and the control part 101 performs collective write process in the disk 11. Thus, a transfer rate to the magnetic disk device 1 can be increased.

The condition data CD32 of FIG. 8(*c*) is an example where the cache control is determined with respect to the read command including Descriptor-2. Upon receipt of the read command from the host 2, the control part 101 acknowledges accompanying information of the read command, and if Descriptor-2 is acknowledged, the condition data CD32 of FIG. 8(*c*) is applied, and a read-ahead process is not executed.

The condition data CD33 of FIG. 8(*c*) is an example where the issue command (including read command and write command) including Descriptor-3 is analyzed. Command estimate of the condition data CD33 is an example acknowledging that it is highly possible that the issue command including Descriptor-3 is a read or write command of random LBA as a result of the analysis by the control part 101. Similarly, contents data estimation of the condition data CD33 is an example acknowledging that it is highly possible that the issue command including Descriptor-3 is non-video data as a result of the analysis by the control part 101. In that case, the cache control is determined to be not performed, and writes to the condition table of the storage part 107 and programming are performed.

Upon receipt of the read command from the host 2, the control part 101 acknowledges accompanying information of the read command, and if Descriptor-3 is acknowledged, the condition data CD33 of FIG. 8(*c*) is applied, and a read-ahead process is not executed. In that case, an access is performed in a period of time designated by Command Duration Limits (CDL) feature set of ATA Command Set-5.

Through the aforementioned steps, statistics of LBA per Descriptor used in Command Duration Limits feature set are calculated, and the cache control is changed based on the statistics result. Furthermore, the analysis and determination of cache control by the analysis part 108 may be performed in the operation or in the factory test. Note that, in the present embodiment, Descriptor is used as accompanying information while an active time of command, and priority of command may be used as accompanying information.

Through the aforementioned steps, based on optional policies, the process operation of the manufacturing process with respect to each HDD 1 can be scheduled.

According to the aforementioned embodiment, a magnetic disk device prepared in consideration of the command characteristics, and a cache control method of the same can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Processing steps in the flowcharts and sequence charts, and the like described in the aforementioned embodiments are within the scope of the invention even if steps are exchanged, deleted, or added without departing from the spirit and scope of the invention.

Processings indicated in the flowcharts, sequence charts, and the like may be realized by hardware such as CPU, IC chip, digital signal processor (Digital Signal Processor: DSP), software operable in a computer including a microcomputer (program, for example), or a combination of hardware and software.

Furthermore, claims written as a processing logic, as a program including instructions executing in a computer, or as a computer-readable recording medium with the instruction are encompassed within the scope of the invention. Furthermore, terms used in the above are not limited, and other expressions which are understandable as substantially the same are encompassed within the scope of the invention.

What is claimed is:

1. A magnetic disk device comprising:
   a control part configured to execute a cache control based on accompanying information included in a command; and
   a storage part configured to store condition table data defining a corresponding relationship between the accompanying information and an operation of the cache control when receiving the command,
   wherein
   the command includes a data write command to a disk or a data read command from the disk,
   the control part performs the cache control based on the condition table data, and
   the accompanying information is a set of one or more Descriptors of a Command Duration Limits (CDL) feature set defined by ATA Command Set-5.

2. The magnetic disk device of claim 1, comprising an analysis part configured to perform analysis of a plurality of command data received previously, wherein
   the control part determines the corresponding relationship based on a result of the analysis.

3. The magnetic disk device of claim 2, wherein the analysis part performs the analysis with respect to command data for each Descriptor of the set of one or more Descriptors.

4. The magnetic disk device of claim 3, wherein a second command includes a same command and a same Descriptor as in a first command, and is a command to designate a second block adjacent to a first block designated by the first command on the disk, and
   the analysis part calculates a sequential ratio which is a ratio of sequential reception of the second command with the first command.

5. The magnetic disk device of claim 4, wherein the sequential ratio is calculated for each Descriptor of the set of one or more Descriptors and saved.

6. The magnetic disk device of claim 5, wherein the control part determines an operation of the cache control based on the sequential ratio acquired by the analysis part and a predetermined threshold with respect to the sequential ratio.

7. The magnetic disk device of claim 6, wherein the control part determines a read-ahead data amount based on the sequential ratio acquired by the analysis part and the predetermined threshold with respect to the sequential ratio.

8. The magnetic disk device of claim 6, wherein the control part determines a read-ahead time based on the sequential ratio acquired by the analysis part and the predetermined threshold with respect to the sequential ratio.

9. The magnetic disk device of claim 6, wherein an operation of the cache control is determined based on Limit Time set in the Descriptor and a predetermined threshold N with respect to the Limit Time.

10. The magnetic disk device of claim 6, wherein a read-ahead amount of a read-ahead control is determined based on Limit Time set in the Descriptor and a predetermined threshold N with respect to the Limit Time.

11. A cache control method of a magnetic disk device, comprising:
    executing a cache control based on accompanying information included in a command;
    storing condition table data defining a corresponding relationship between the accompanying information and an operation of the cache control when receiving the command; and
    performing the cache control based on the condition table data, wherein
    the command includes a data write command to a disk or a data read command from the disk, and
    the accompanying information is a set of one or more Descriptors of a Command Duration Limits (CDL) feature set defined by ATA Command Set-5.

* * * * *